United States Patent
Moon et al.

(10) Patent No.: US 6,770,315 B2
(45) Date of Patent: Aug. 3, 2004

(54) COFFEE ROASTER HAVING MULTIPLE ROASTING STAGES

(75) Inventors: Jung S. Moon, Buffalo Grove, IL (US); Rong Liu, Gurnee, IL (US); Kitak Chae, Seoul (KR); Jongrok Kim, Seoul (KR)

(73) Assignee: Hearthware Home Products, Inc., Gurnee, IL (US)

( * ) Notice: Subject to any disclaimer, the term of this patent is extended or adjusted under 35 U.S.C. 154(b) by 84 days.

(21) Appl. No.: 10/137,671

(22) Filed: May 2, 2002

(65) Prior Publication Data

US 2003/0207010 A1 Nov. 6, 2003

(51) Int. Cl.[7] .............................. A23F 5/04; A23N 12/00
(52) U.S. Cl. ........................ 426/466; 34/360; 34/576; 34/594; 99/286; 99/323.7; 99/468; 99/476; 426/467
(58) Field of Search ................................ 426/466, 467; 99/286, 323.7, 468, 469, 476, 483; 34/233, 360, 576, 594; 219/385, 400

(56) References Cited

U.S. PATENT DOCUMENTS

| | | | |
|---|---|---|---|
| 4,325,191 A | 4/1982 | Kumagai et al. | 34/54 |
| 4,602,147 A | 7/1986 | Gell | 219/509 |
| 4,871,901 A | 10/1989 | Igusa et al. | 219/400 |
| 5,269,072 A | 12/1993 | Waligorski | 34/57 E |
| 5,394,623 A | 3/1995 | Sewell | 34/544 |
| 5,500,237 A | 3/1996 | Gell, Jr. et al. | 426/466 |
| 5,564,331 A | 10/1996 | Song | 99/469 |
| 5,902,623 A * | 5/1999 | Cochran | 426/466 |
| 5,996,480 A | 12/1999 | Kelley et al. | 99/468 |
| 6,053,093 A | 4/2000 | Gerhardt et al. | 99/331 |
| 6,112,644 A * | 9/2000 | Song | 99/323.7 |

* cited by examiner

Primary Examiner—George C. Yeung
(74) Attorney, Agent, or Firm—Bell, Boyd & Lloyd, LLC

(57) ABSTRACT

A roaster for roasting coffee beans includes a roasting chamber having a top and a bottom for holding coffee beans when the beans are being roasted, a cover seated on the top of the roasting chamber and a base on which the bottom of the roasting chamber is seated. A device is provided in the base for supplying airflow into the roasting chamber. A controller controls the airflow supplying device to generate a roasting temperature inside the roasting chamber that tracks a predetermined temperature curve. The temperature curve includes a first stage in which the roasting temperature is set to a first predetermined level for a first predetermined time period, and a second stage in which the roasting temperature is set to a second predetermined level that is higher than the first predetermined level. The second stage includes a plurality of stages including a current stage in which the roasting temperature is set to a current predetermined level for a current predetermined time period and a subsequent stage in which the roasting temperature is set to a subsequent predetermined level that is higher than the current predetermined level for a subsequent predetermined time period.

23 Claims, 11 Drawing Sheets

COFFEE ROASTER HAVING MULTIPLE ROASTING STAGES

The present invention generally relates to coffee roasters, and more particularly to a coffee roaster that has multiple roasting stages.

BACKGROUND

A demand for coffee roasters for home use has been on the rise in response to growing number of devoted coffee drinkers who desire the flavor of freshly roasted coffee. These home coffee roasters typically have a heating element and a fan for directing hot air into a roasting chamber where the coffee beans are roasted as they are blown around by a hot air stream. The controls on these roasters typically include a variable timer that allows beans to be roasted at a constant temperature for a prescribed time. Coffee beans come in different densities and have varying moisture content. As a result, roasting coffee beans at a constant temperature for a prescribed time, as in conventional coffee roasters, do not always result in consistent and fully developed flavor that coffee enthusiasts desire.

There are coffee roasters that have more than one roasting stages, where coffee beans are roasted, for example, at one temperature for some time and at another temperature for a certain other time period. These roasters, however, do not have the means for maintaining the desired roasting temperature when the ambient temperature varies. Depending on the ambient temperature in which the roaster is operated, there could be a significant temperature variation in the roasting chamber from the desired temperature. For example, some users are known to place the coffee roaster outside the home during use, so as not to have smoke from the roaster fill the inside the house. In such a situation, the temperature inside the roasting chamber may not be at the desired temperatures, resulting in the beans being over or under roasted.

SUMMARY OF THE INVENTION

The present invention is directed to a roaster for roasting coffee beans, and includes a roasting chamber having a top and a bottom for holding coffee beans when the beans are being roasted, a cover seated on the top of the roasting chamber and a base on which the bottom of the roasting chamber is seated. A device is provided in the base for supplying airflow into the roasting chamber. A controller controls the airflow supplying device to generate a roasting temperature inside the roasting chamber that tracks a predetermined temperature curve. The temperature curve includes a first stage in which the roasting temperature is set to a first predetermined level for a first predetermined time period, and a second stage in which the roasting temperature is set to a second predetermined level that is higher than the first predetermined level. The second stage includes a plurality of stages including a current stage in which the roasting temperature is set to a current predetermined level for a current predetermined time period, and a subsequent stage in which the roasting temperature is set to a subsequent predetermined level that is higher than the current predetermined level for a subsequent predetermined time period.

DETAILED DESCRIPTION OF THE INVENTION

Figure 1:
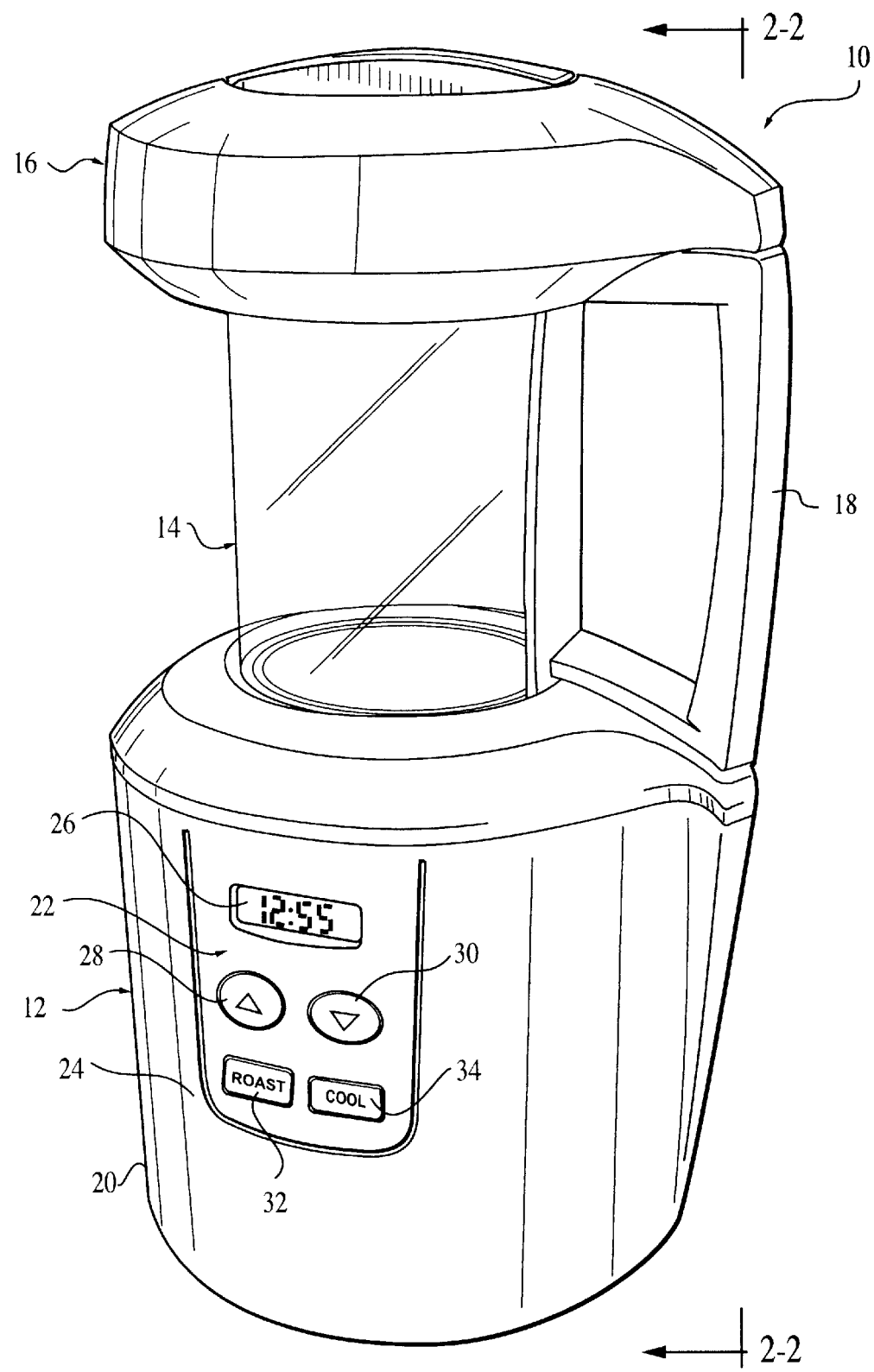
FIG. 1 is a perspective view of a coffee roaster in accordance with an embodiment of the present invention.

Turning now to FIG. 1, a coffee roaster in accordance with an embodiment of the present invention is indicated generally at 10, and includes a base 12, a generally cylindrical roasting chamber 14 seated in the base 12, and a cover 16 removably enclosing the roasting chamber at the opposite end from the base. A handle 18 is attached to the roasting chamber 14 to enable the roasting chamber to be removed from the base 12, and keep the roasting chamber steady while the cover 16 is being removed from or put on the roasting chamber.

The base 12 includes a housing 20 which is made preferably of lightweight plastic material. A control panel 22 is provided on a side 24 of the housing and includes a timer display 26 that shows the time remaining in the roasting process. The time can be adjusted by an UP switch 28 to increase the roasting time and a DOWN switch 30 to decrease the roasting time. The initial time, however, is set automatically to a preset time when the coffee roaster 10 is powered ON. The control panel 22 also includes a ROAST switch 32 that activates the roasting process for the time period displayed in the timer 26. A COOL switch 34 is provided to terminate the roasting process prior to the time displayed in the timer 26. The roaster 10 operates for a predetermined time without heat before being shut down when the COOL switch 34 is activated.

Figure 2:
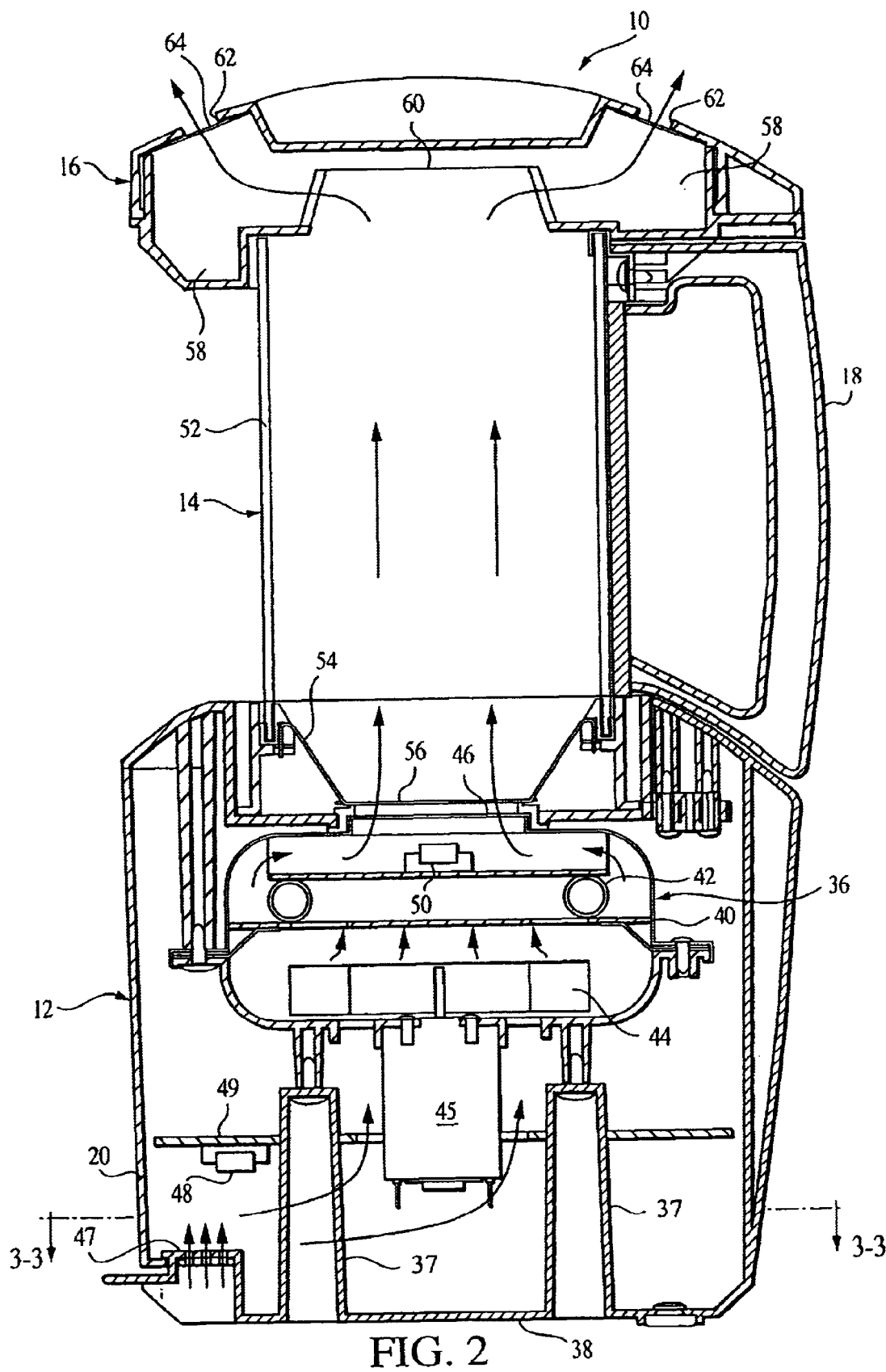
FIG. 2 is a sectional view of the coffee roaster of FIG. 1 along line 2—2.

Turning now to FIG. 2, a heater assembly 36 is provided inside the housing 12 and mounted on at least a pair of upright posts 37 which protrudes upwardly from a bottom 38 of the base 12. The heater assembly 36 includes a casing 40 containing a primary electrical resistance heater 42 located directly over a fan 44. A fan motor 45 is attached to the outside of the casing 40 for rotating the fan 44, which generates an air stream (indicated by curved arrows) that flow through the primary heater 42 and into the roasting chamber 14 through an opening 46 at the top of the heater assembly casing 40. An inlet airflow control assembly 47 is provided generally at the bottom 38 of the base 12 for controlling the volume of outside or ambient air that is pulled into the housing 20 for generating the air stream by the fan 44.

In accordance with an embodiment of the invention, an inlet air temperature sensor 48 is attached to a control board 49 (which is coupled to the posts 37) near the inlet airflow control assembly 47 for sensing the temperature of ambient air that is pulled through the airflow control assembly. The inlet air temperature sensor 48 is preferably a thermistor. In addition to the inlet air temperature sensor 48, an outlet air temperature sensor 50 is located in the heater assembly upstream of the primary heater 42 for detecting the temperature of air entering the roasting chamber 14. Preferably, the roasting temperature sensor 50 is also a thermistor.

The roasting chamber 14 includes a generally cylindrical wall 52 made preferably of heat-resistant, transparent glass or like material to allow the user to view the coffee beans being roasted. The wall 52 is secured at its bottom opening to a cup 54, which has a generally conical shape with a flat bottom 56. The bottom 56 of the cup 54 has a plurality of slits or holes (not shown) which allow air stream from the heater assembly 36 to enter the roasting chamber 14, while preventing coffee beans from falling into the heater assembly. The handle 18 is attached to the wall 52 of the roasting chamber.

The cover 16 is adapted to removably engage the top opening of the roasting chamber wall 52. The cover 16 is made of heat-resistant plastic or like material, and includes a receiver 58 for collecting hulls (not shown) that peel off the coffee beans during roasting and are carried upwardly by the air stream generated by the fan 46 through an opening 60 at the bottom of the cover. Another opening 62 is provided at the top of the cover 16 to allow the air stream to be vented out of the cover. In the preferred embodiment, the top opening 62 is covered with a fine mesh screen 64 to retain the hulls within the receiver 58 of the cover 16.

Figure 3:
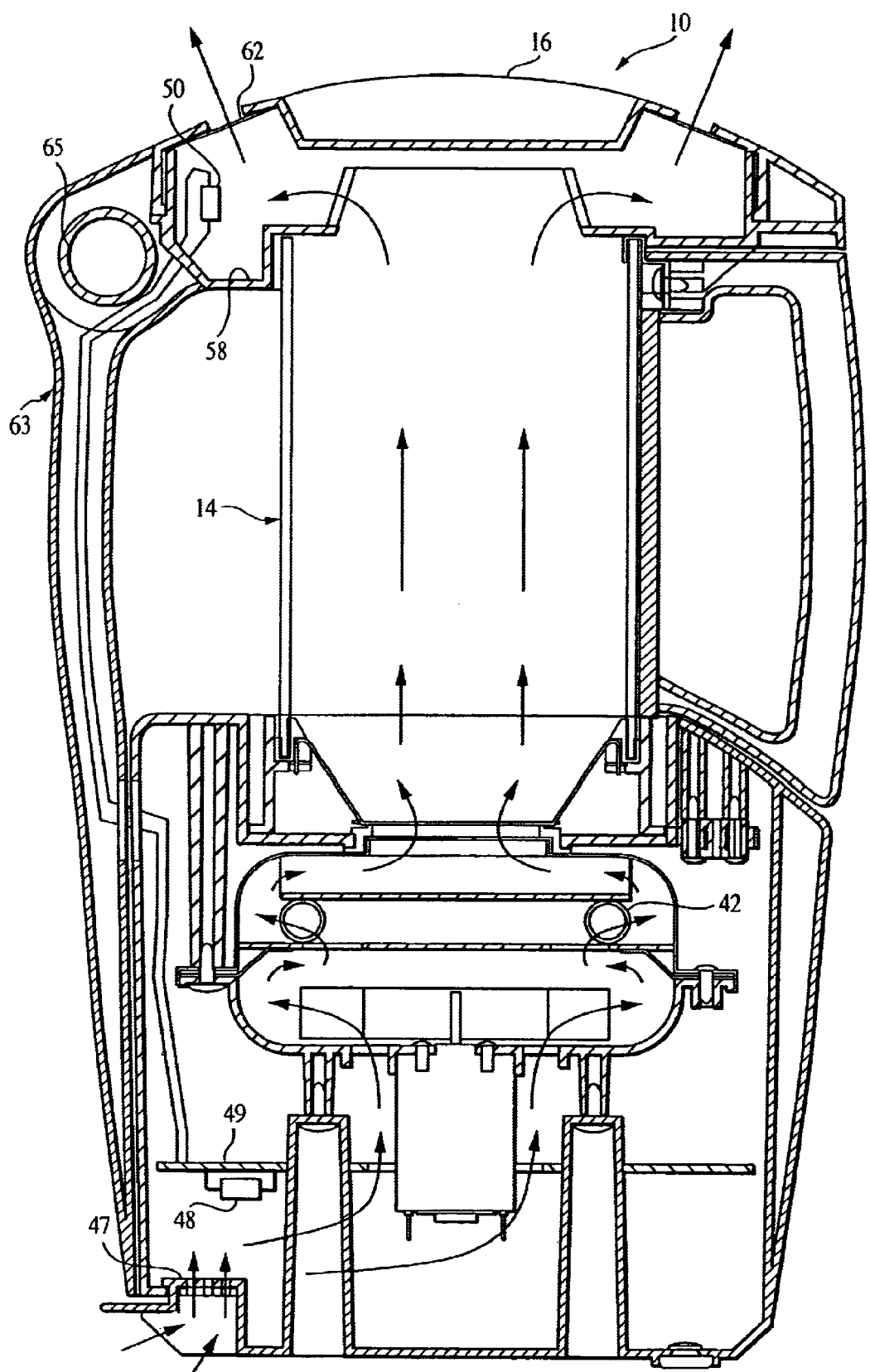
FIG. 3 is a sectional view of the coffee roaster of FIG. 1 along line 2—2, showing an alternate arrangement of temperature sensors.

Turning now to FIG. 3 and in accordance another embodiment of the present invention, the outlet air temperature sensor 50 is located in the hull receiver 58 near the top opening 62 where the air exits the coffee roaster 10. This arrangement allows the sensor 50 to detect the temperature of air exiting the roasting chamber 14. The coffee roaster 10 is also provided with a cover retainer 63 which is attached to the base 12, and connected to the cover 16 to allow the cover to be opened pivotally about an axis 65 and not become separated from the roaster 10. The cover retainer 63 is hollow to enable the temperature sensor 50 to be electrically connected to the control board 49.

Figure 4:
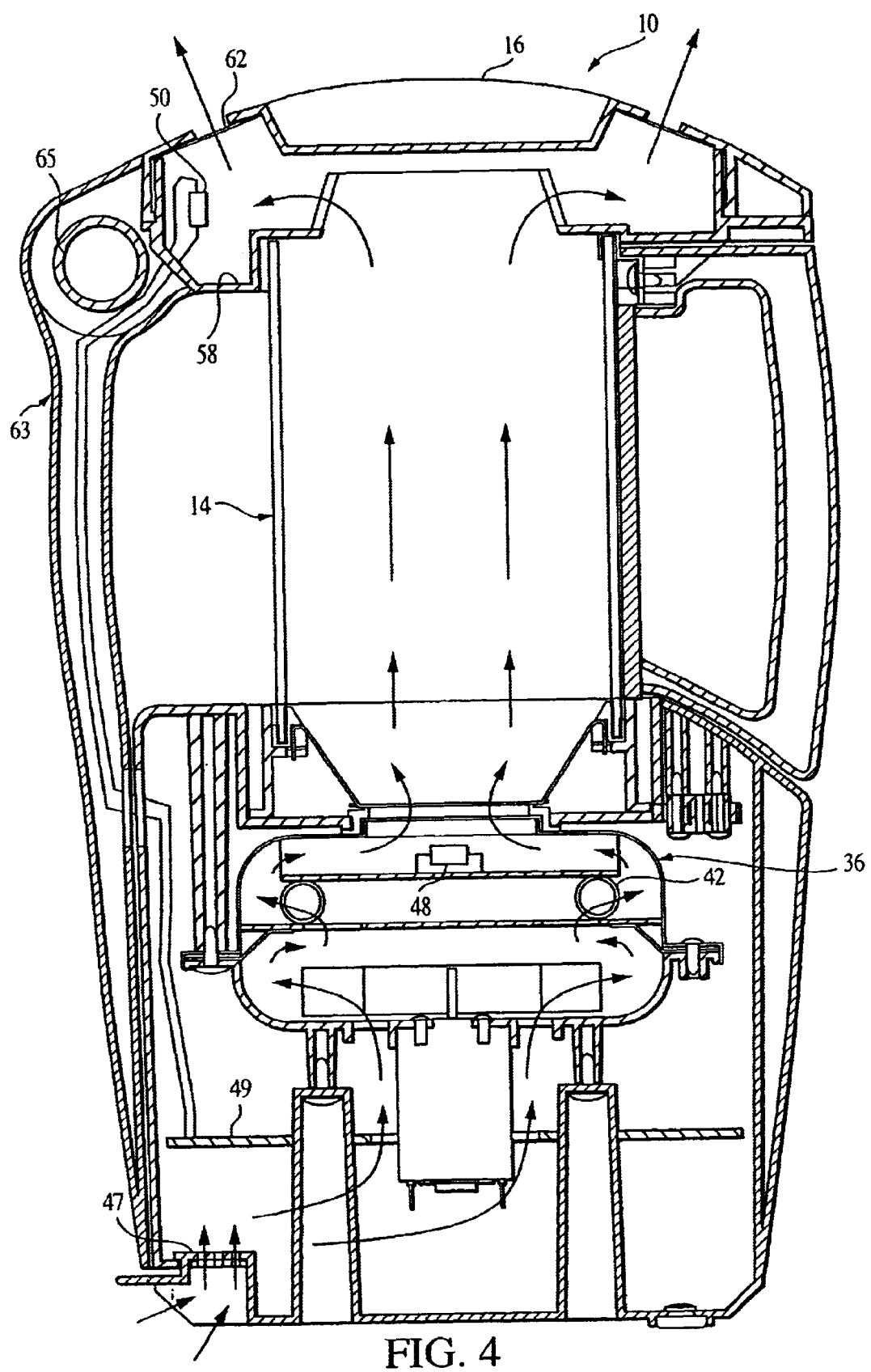
FIG. 4 is a sectional view of a coffee roaster of FIG. 1 along line 2—2, showing an another alternate arrangement of the temperature sensors.

Turning now to FIG. 4, and in accordance yet another embodiment of the present invention, the outlet air temperature sensor 50 is located in the hull receiver 58 near the top opening 62, as in the embodiment shown in FIG. 3. However, the inlet air temperature sensor 48 is located in the heater assembly 36 upstream of the primary heater 42, rather than being placed near the inlet airflow control assembly 47, as in the embodiment shown in FIG. 2. This arrangement allows for detections of difference in the air temperature going into and coming out of the roasting chamber 14. As in the embodiment shown in FIG. 3, the coffee roaster 10 of this embodiment is also provided with a cover retainer 63 which is attached to the base 12, and connected to the cover 16 to allow the cover to be opened pivotally about an axis 65 and not become separated from the roaster 10. The cover retainer 63 is hollow to enable the temperature sensor 50 to be electrically connected to the control board 49.

Figure 5:
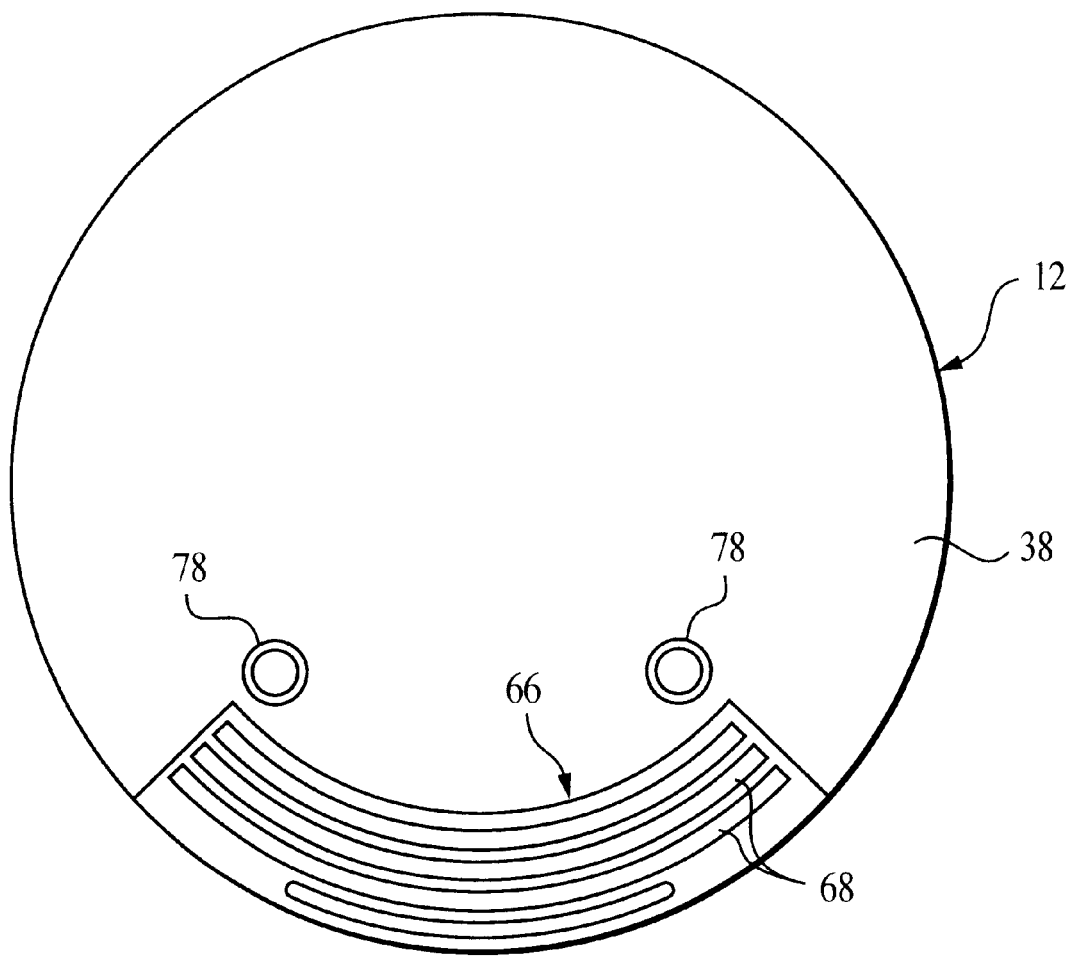
FIG. 5 is a simplified plan view of an air inlet of the coffee roaster of FIG. 1.
Figure 6:
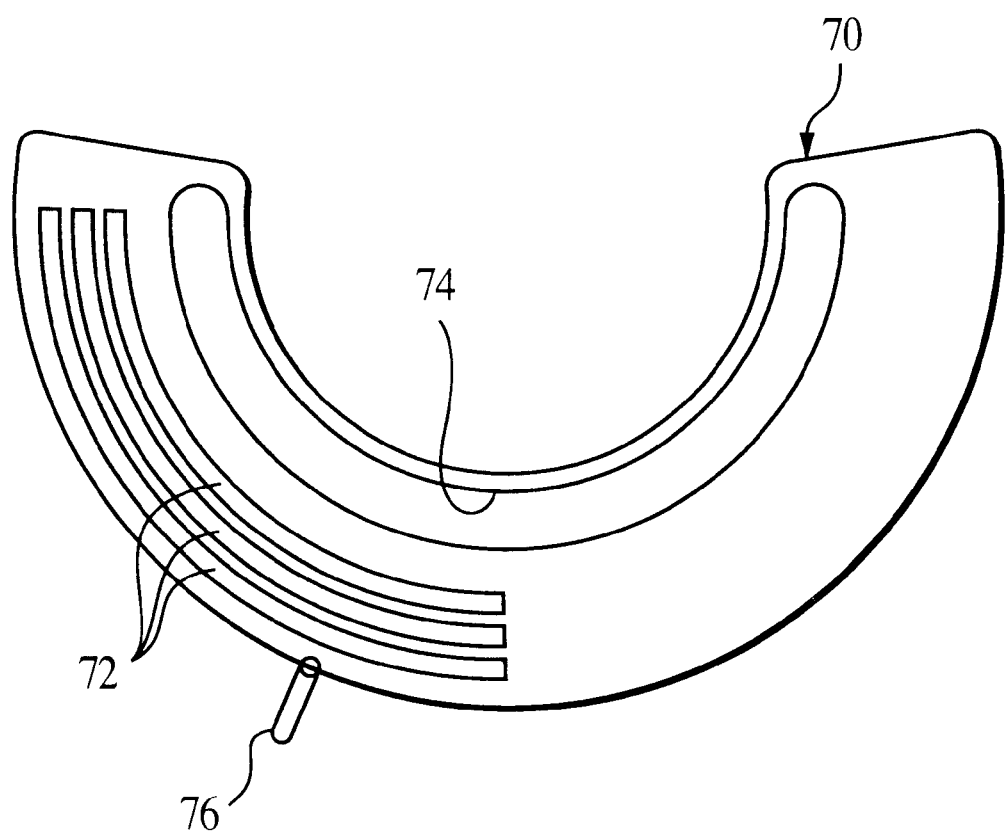
FIG. 6 is a plan view of a cover for controlling airflow through the air inlet shown in FIG. 5.
Figure 7:
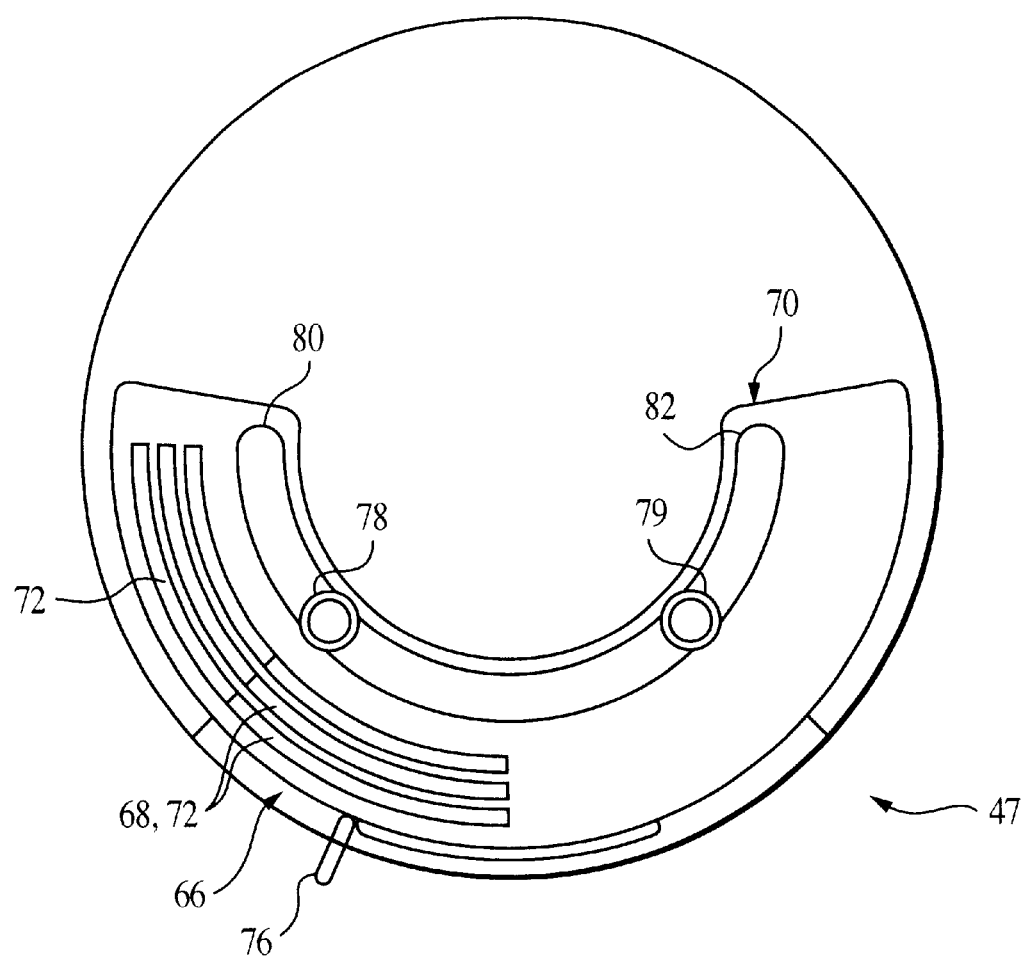
FIG. 7 is a plan view of an inlet airflow control assembly incorporating the air inlet and the cover shown in FIGS. 5 and 6, respectively.

Turning now to FIGS. 5–7, the inlet airflow control assembly 47 includes an air inlet 66 which includes a plurality of elongated openings 68 that are aligned generally parallel to each other (best shown in FIG. 5). The air inlet 66 is formed on the bottom 38 of the base 12. The airflow control assembly 47 also includes a cover 70 (best shown in FIG. 6) having elongated openings 72 that are arranged generally corresponding to the openings 68 on the air inlet 66. The openings 72 extend from near one end of the cover 70 to approximately the middle of the cover 70. The cover 70 also has an elongated guide channel 74 that extends substantially the length of the cover 70. A slide lever 76 is attached to the cover 70 at about the middle of the cover 70.

When assembled, as shown in FIG. 7, the openings 68 on the air inlet 66 and the openings 72 on the cover 70 substantially align with each other. A pair of spaced stops 78, 79 protruding from the bottom 38 of the housing 12 is inserted in the guide channel 74. The stops 78, 79 keep the cover 70 in sliding contact with the air inlet 66 and act as boundary to limit the sliding movement of the cover on the surface of the air intake 66.

In operation, the openings 68 of the air intake 66 become more exposed when the lever 76 is moved to the right or in the counterclockwise direction, until fully exposed when the left end 80 of the channel 74 comes in contact with the nearest stop 78. On the other hand, the openings 68 become less exposed when the lever 76 is moved to the right, in the clockwise direction, until fully closed by the half of the cover 70 that does not have any openings, when the right end 82 of the channel 74 comes in contact with its nearest stop 79.

In this manner, the inlet airflow control assembly 47 allows the user to control the volume of air permitted into the base 12 of the roaster 10, and accordingly, into the roasting chamber 14 in the air stream generated by the fan 46. An increase in the air volume in the roasting chamber 14 generally reduces the temperature in the chamber, and a decrease in the air volume generally results in a temperature increase in the chamber. Thus, the airflow control assembly 47 offers the user a greater control over the roasting temperature.

Figure 8:
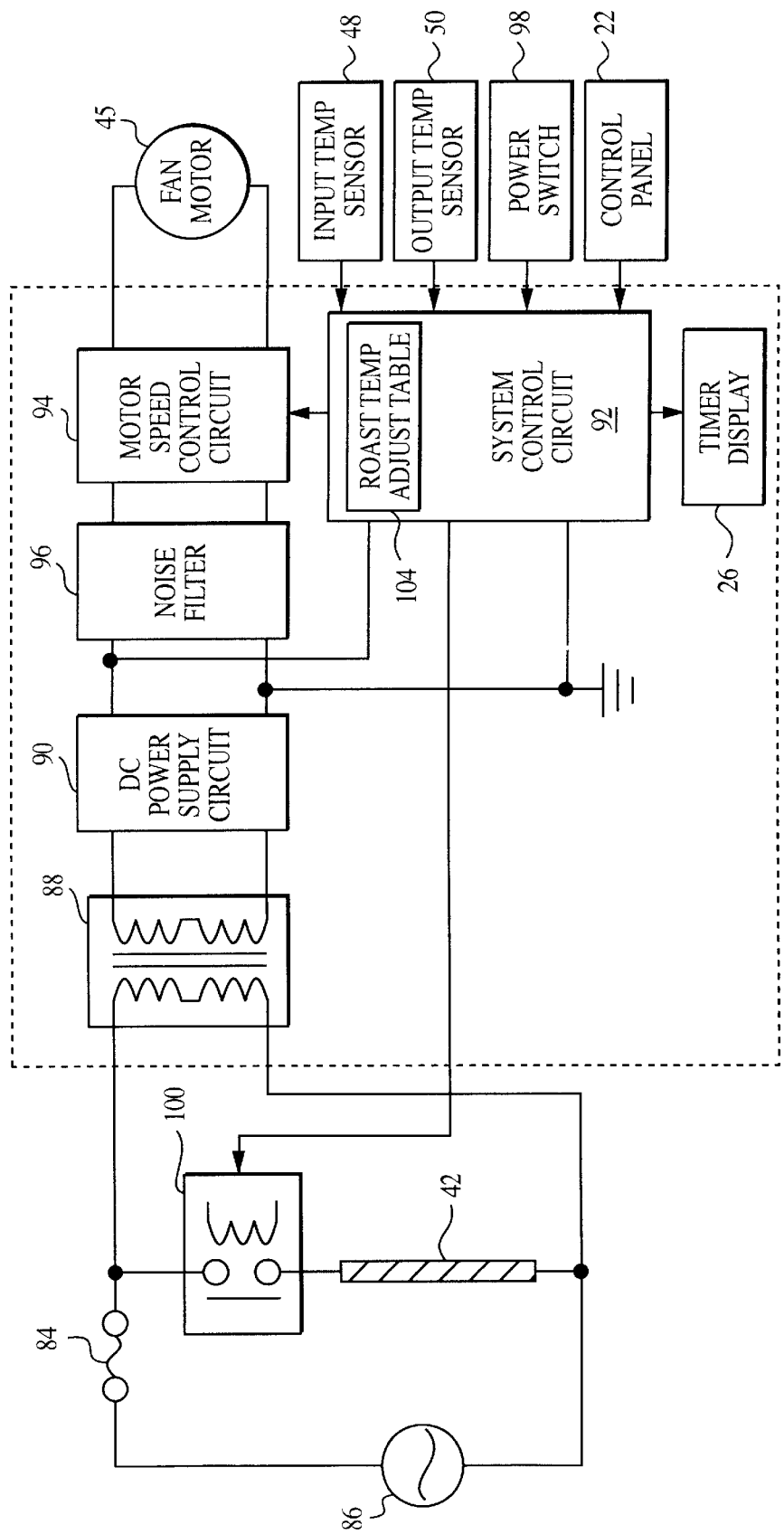
FIG. 8 is a electrical block diagram of the coffee roaster of FIG. 1.

Turning now to FIG. 8, the coffee roaster 10 is provided with a thermal protector 84, which may be a thermal fuse or a thermostat, that activates to disconnect power from AC line voltage 86 to the roaster in the event the thermal fuse is heated above its rated temperature. A power transformer 88 is also provided to reduce the input line voltage 86 to an operating level of the roaster 10, approximately 15 VAC. A DC power supply circuit 90 converts the reduced AC voltage from the transformer 88 to DC voltage, which is supplied to a system control circuit 92 and to a motor speed control circuit 94 via a noise filter 96. The system control circuit 92 receives input signals from the inlet and outlet temperature sensors 48, 50, a power switch 98 and the control switches 28, 30, 32, 34 on the control panel 22, and outputs control signals to the primary heater 42 via a power relay 100, the motor speed control circuit 94 and to the timer display 26. The motor speed control circuit 94 controls the speed of the fan motor 45, based on signals received from the system control circuit 92, by varying the voltage applied to the motor, for example, in the range of approximately 4.5 V to 15 V. The power switch 98 is provided as a safety switch to disconnect power 86 to the primary heater 42 when the roasting chamber 14 is removed from the base 12.

Figure 9:
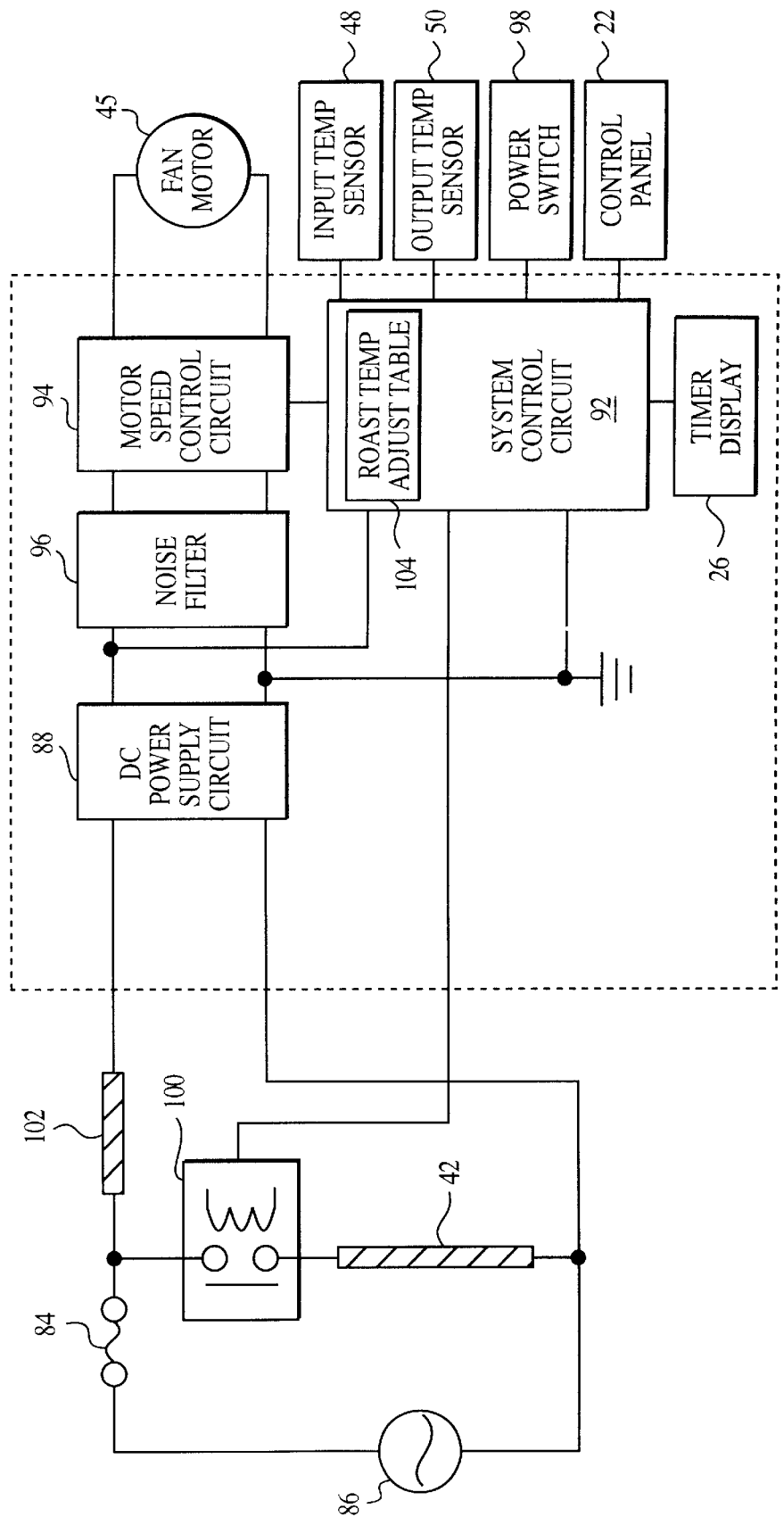
FIG. 9 is a electrical block diagram of the coffee roaster of FIG. 1 in accordance with another embodiment of the present invention.
Figure 10:
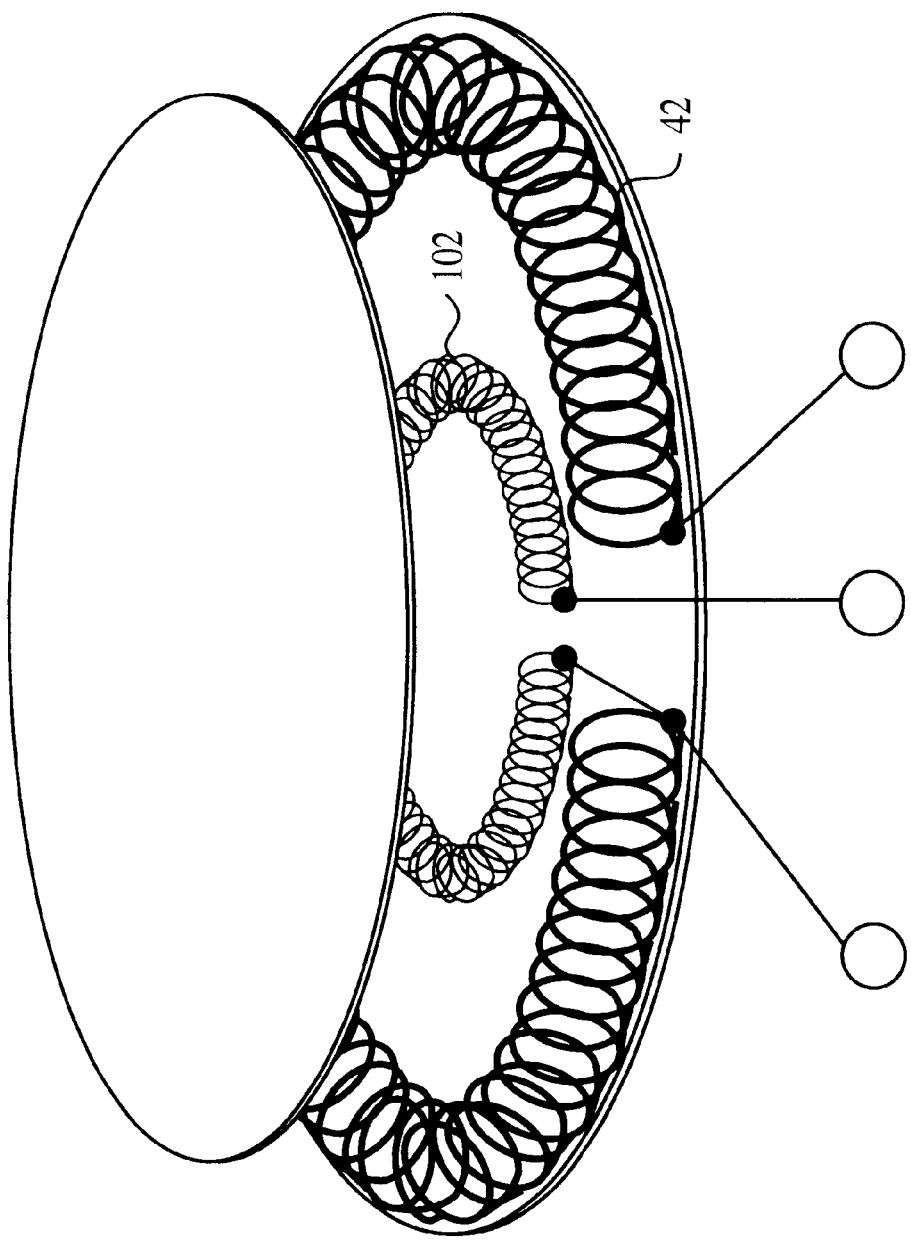
FIG. 10 is a diagram of a subheater shown in FIG. 9.

Referring to FIGS. 9 and 10, and in accordance with another embodiment of the present invention, a subheater 102 is connected between the input AC line voltage 86 and the DC power supply circuit 88 for reducing the AC line voltage to a lower operating voltage of approximately 15 VAC, for example. This reduced AC voltage is then converted to DC voltage by the DC power supply circuit 88 as in the embodiment shown in FIG. 8. The subheater 102 is provided within the casing 40 of the heater assembly 36 along with the primary heater 42 (best shown in FIG. 10).

Figure 11:
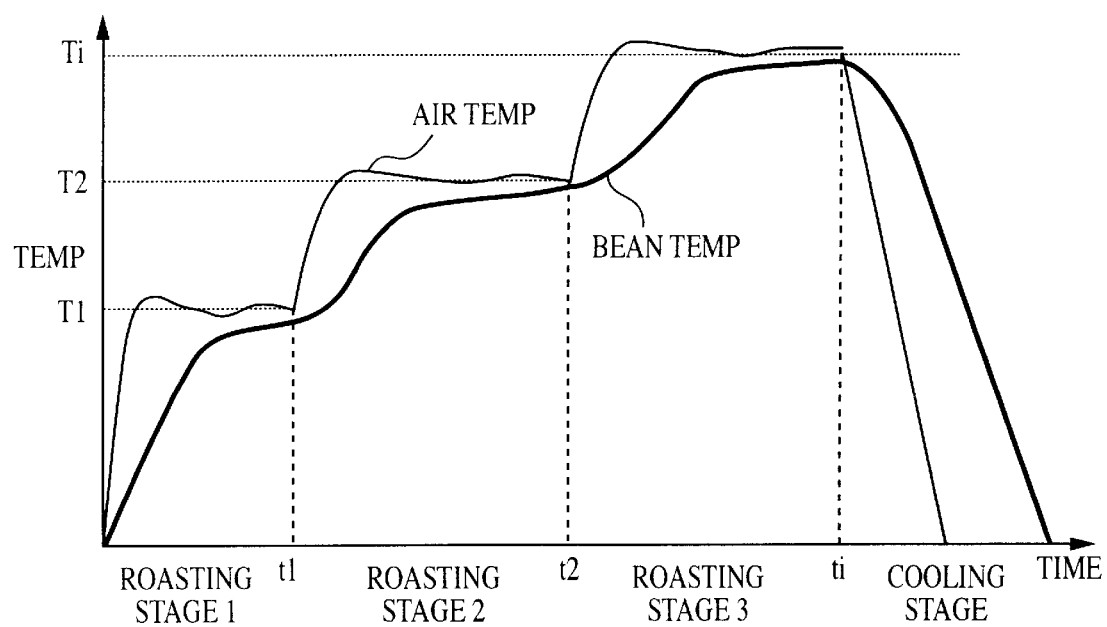
FIG. 11 is a graph showing the relationship between the temperature of air inside a roasting chamber of the coffee roaster of FIG. 1 and the coffee beans being roasted.

Turning now to FIG. 11, and in accordance with one embodiment of the present invention, the coffee roaster 10 is adapted to have at least two roasting stages where the temperature in the subsequent roasting stage is higher than that of the preceding roasting stage. In the preferred embodiment, there are three roasting stages, which is followed by a cooling stage. In the first stage the air inside the roasting chamber 14 closely follows the predetermined air temperature curve shown in FIG. 11 up to a temperature T1 of approximately 200° C. for a predetermined time t1 of approximately 3 minutes. In the second stage, the temperature in the roasting chamber 14 rapidly and closely follows the air temperature curve to a predetermined temperature T2 of approximately 220° C., which is higher than T1. This temperature is maintained for approximately 3 minutes until time t2, at which time the temperature in the roasting chamber is again rapidly raised and closely follows the air temperature curve to a predetermined temperature T3 of approximately 240° C., and maintained for approximately 2 minutes until time t3, at which time the temperature in the roasting chamber is allowed to rapidly cool within a predetermined period, as shown by the portion of the air temperature curve in the cooling stage, approximately 3 minutes. In this manner, the temperature of the beans closely tracks the predetermined air temperature curve and undergo a series of predictable roasting cycles to become uniformly roasted. It should be understood that the temperatures T1, T2, T3 and the times t1, t2, t3 given above are only examples, and that other temperatures and times are contemplated.

In operation, when the ROAST switch 32 (best shown in FIG. 1) is depressed by the user, the coffee roaster 10 automatically enters the three-stage roasting stages described above and programmed in the system control circuit 92. When the timer switches 28, 30 are activated to set the roasting time by the user, the roaster 10 goes through the programmed roasting stages, but stops the roasting process at the current roasting stage that it is in when the set time has elapsed, and automatically enters the cooling stage for a predetermined time.

During each roasting stage, the inlet temperature sensor 48 and the outlet temperature sensor 50 measure the air temperature at their respective locations, to allow the system control circuit 92 to closely follow the predetermined air temperature curve throughout each roasting stage. In the preferred embodiment, the inlet temperature sensor 48 is located near the inlet airflow control assembly 47, so as to measure the temperature of ambient air entering the coffee roaster 10 (best show in FIG. 2). The outlet temperature sensor 50 is located proximately downstream of the heater 42 to measure the temperature of air entering the roasting chamber 14.

Turning back to FIG. 8, and in accordance with the present invention, the system control circuit 92 sends a signal to the motor speed control circuit 94 to decrease power to the fan motor 45, so as to decrease airflow to the roasting chamber 14, which raises the temperature within the roasting chamber. Conversely, the system control circuit 92 sends a signal to the motor speed control circuit 94 to increase power to the fan motor 45, so as to increase airflow to the roasting chamber 14, which lowers the temperature within the roasting chamber 14.

In the preferred embodiment, the system control circuit 92 is programmed with a roasting temperature adjustment table 104 which gives information as to power that should be applied to the fan motor 45 (via the motor speed control circuit 94) to track the predetermined air temperature curve (best shown in FIG. 11) at various ambient temperature ranges, as detected by the inlet temperature sensor 48. Depending on the ambient temperature, the temperature of air entering the roasting chamber 14 will vary substantially even when the power to the fan motor 45 is constant. For example, the temperature of air entering the roasting chamber 14 when the ambient temperature is substantially below room temperature (as when the roaster 10 is operated outdoors on a winter day) will be significantly lower than the temperatures produced by the heater assembly 36 operating at the same fan motor power, but at room temperature. Also, it will require longer time to reach the desired temperature when the ambient temperature is substantially below room temperature, and may not be able to reach it under some ambient temperatures. The roasting temperature adjustment table 104 and the inlet and outlet air temperature sensors 48, 50 provide information necessary for the system control circuit 92 to control the power that is applied to the fan motor 45, so that the predetermined temperature curve is closely tracked despite variations in the ambient temperature.

In accordance with another embodiment of the invention, only one temperature sensor, the outlet temperature sensor 50 shown in FIG. 2, is utilized to obtain the desired temperature in the roasting chamber 14. In this arrangement, the system control circuit 92 receives the temperature of airflow entering the roasting chamber 14 measured periodically (e.g., every 5 seconds) by the temperature sensor 50. If the measured temperature varies from the predetermined temperature curve, the system control circuit 92 outputs a signal to the motor speed control circuit 94 to decrease power to the fan motor 45, thereby increasing air temperature. On the other hand, if the measured temperature is higher than the desired temperature, power to the fan motor 45 is increased to decrease the air temperature inside the roasting chamber 14.

In the embodiment described above in which the inlet air temperature sensor 48 is provided near the inlet airflow control assembly 47 and the outlet air temperature sensor 50 provided in the cover 16, as shown in FIG. 3, the control of the temperature inside the roasting chamber 14 is similar to the two sensor 48, 50 embodiment described above. In other words, the system control circuit 92 controls the power that is applied to the fan motor 45 to achieve the predetermined air temperature curve in the roasting chamber 14 at various ambient temperature ranges.

In the embodiment described above in which the input temperature sensor 48 is provided proximate and downstream of the heater 42 and the output temperature sensor 50 is provided in the cover 16, as shown in FIG. 4, the system control circuit 92 controls the power supplied to the fan motor 45 (via the motor speed control circuit 94), so that the temperature inside the roasting chamber 14 tracks the predetermined temperature curve, by taking the average of temperatures at the two locations of the sensors 48, 50.

From the foregoing description, it should be understood that an improved coffee roaster has been shown and described which has many desirable attributes and advantages. Coffee beans are roasted in multiple roasting stages at predetermined roasting temperature so that substantially uniform result is obtained. The roaster also employs at least one temperature sensor to closely track a predetermined temperature curve.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A roaster for roasting coffee beans comprising:
   a roasting chamber having a top and a bottom for holding coffee beans when the beans are being roasted;
   a cover seated on said top of said roasting chamber;
   a base on which said bottom of said roasting chamber is seated;
   means provided in said base for supplying airflow into said roasting chamber; and,
   control means for controlling said airflow supplying means to generate a roasting temperature inside said roasting chamber that tracks a predetermined temperature curve;
   wherein said temperature curve includes a first stage in which said roasting temperature is set to a first predetermined level for a first predetermined time period, and a second stage in which said roasting temperature is set to a second predetermined level that is higher than said first predetermined level, and
   said second stage includes a plurality of stages including a current stage in which said roasting temperature is set to a current predetermined level for a current predetermined time period and a subsequent stage in which said roasting temperature is set to a subsequent predetermined level that is higher than said current predetermined level for a subsequent predetermined time period.

2. The roaster as defined in claim 1 wherein said plurality of roasting stage includes a third stage in which said roasting temperature is lowered to allow the coffee beans to cool.

3. The roaster as defined in claim 1 wherein said control means is in communication with a first sensor for measuring an air temperature at a first location in said roaster and a second sensor for measuring an air temperature at a second location in said roaster, for controlling said roasting temperature to track said temperature curve based on said air temperatures measured by said first and second sensors.

4. The roaster as defined in claim 3 wherein said control means controls said roasting temperature by controlling said airflow supplying means to generate said airflow having a temperature that tracks said temperature curve as measured by said second sensor, and adjusting said airflow temperature based on said temperature measured by said first sensor.

5. The roaster as defined in claim 4 wherein said control means includes a roasting temperature adjustment means for indicating an adjustment to be made to said airflow temperature based on said temperature measured by said first sensor.

6. The roaster as defined in claim 5 wherein said first location is proximate an air inlet on said base for allowing ambient air to be drawn into said base, and said second location is between said airflow supplying means and said roasting chamber.

7. The roaster as defined in claim 5 wherein said first location is proximate an air inlet on said base for allowing ambient air to be drawn into said base, and said second location is in said cover.

8. The roaster as defined in claim 3 wherein an average of said air temperatures at said first location and said second location is used to track said temperature curve.

9. The roaster as defined in claim 8 wherein said first location is between said airflow supplying means and said roasting chamber, and said second location is in said cover.

10. The roaster as defined in claim 1 further including an inlet airflow control assembly for controlling an amount of ambient air entering said base.

11. The roaster as defined in claim 10 wherein said inlet airflow control assembly includes an opening formed on said base, and a cover for adjusting airflow through said opening.

12. The roaster as defined in claim 11 wherein said opening includes at least one elongated slot, and said cover includes at least one elongated slot corresponding to said slots of said opening for adjustably increasing and decreasing a size of said slots of said opening.

13. The roaster as defined in claim 1 wherein said airflow supplying means includes a resistance heating element and a fan for generating said airflow through said heating element.

14. The roaster as defined in claim 13 wherein said control means increases a speed of said fan to increase said roasting temperature generated by said airflow supplying means, and decreases said speed to decrease said roasting temperature generated by said airflow supplying means.

15. The roaster as defined in claim 1 further including means for reducing input AC power, and a converter for converting said reduced AC power to DC power.

16. The roaster as defined in claim 15 wherein said power reducing means is a step down transformer.

17. The roaster as defined in claim 15 wherein said power reducing means is a resistance heating element.

18. The roaster as defined in claim 1 further including a sensor for measuring a temperature of said airflow produced by said airflow supplying means, wherein said control means controls said airflow supplying means to generate said roasting temperature based on said airflow temperature measured by said sensor.

19. A method of roasting coffee beans in a roasting chamber of a roasting apparatus, comprising the steps of:

controlling a temperature of an airflow supplied to a roasting chamber to follow a predetermined temperature curve, said following of said temperature curve including;
roasting the beans in a first stage in which a roasting temperature is set to a first predetermined level for a first predetermined time period;
roasting the beans in a second stage in which said roasting temperature is set to a second predetermined level that is higher than said first predetermined level,
said second stage including a plurality of stages including a current stage in which said roasting temperature is set to a current predetermined level for a current predetermined time period and a subsequent stage in which said roasting temperature is set to a subsequent predetermined level that is higher than said current predetermined level for a subsequent predetermined time period.

20. The method as defined in claim 1 further including the step of reducing said roasting temperature to cool the coffee beans.

21. A roaster for roasting coffee beans comprising:

a roasting chamber having a top and a bottom for holding coffee beans when the beans are being roasted;

a cover seated on said top of said roasting chamber;

a base on which said bottom of said roasting chamber is seated;

an inlet airflow control assembly provided on said base for controlling an amount of ambient air entering said base;

means provided in said base for supplying an airflow into said roasting chamber; and, control means for controlling said airflow supplying means to generate a roasting temperature inside said roasting chamber.

22. The roaster as defined in claim 21 wherein said inlet airflow control assembly includes an opening formed on said base, and a cover for adjusting an ambient airflow through said opening.

23. The roaster as defined in claim 22 wherein said opening includes at least one elongated slot, and said cover includes at least one elongated slot corresponding to said slots of said opening for adjustably increasing and decreasing a size of said slots of said opening.

* * * * *